No. 852,199. PATENTED APR. 30, 1907.
J. POEHNER.
CRANK SHAFT.
APPLICATION FILED JAN. 3, 1907.
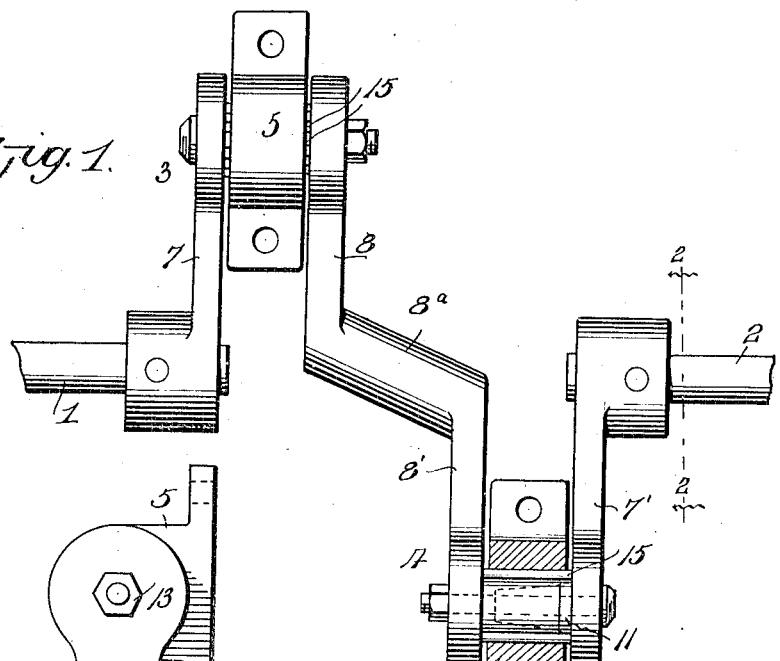
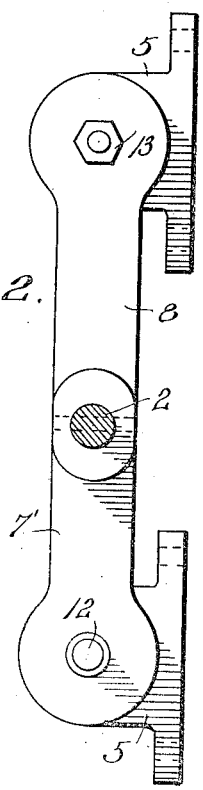
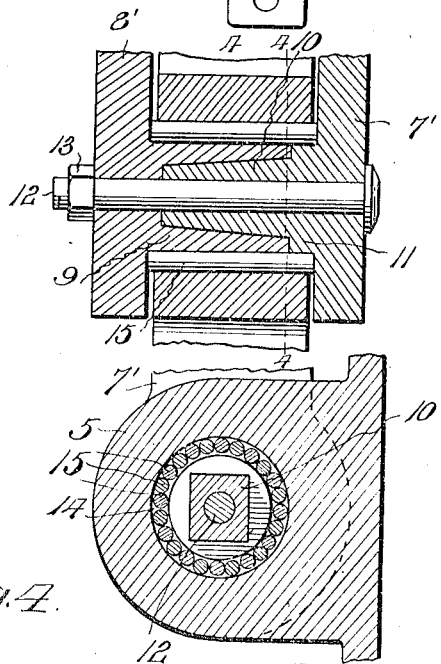
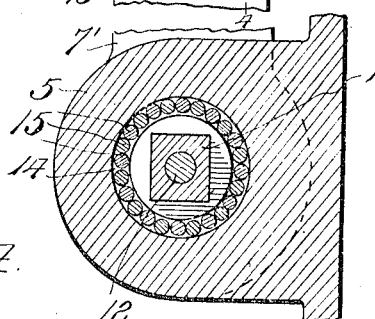
Witnesses
Frank Hough
C. C. Hines.
Inventor
John Poehner,
By Victor J. Evans
Attorney

UNITED STATES PATENT OFFICE.

JOHN POEHNER, OF CLEARWATER, KANSAS.

CRANK-SHAFT.

No. 852,199.	Specification of Letters Patent.	Patented April 30, 1907.

Application filed January 3, 1907. Serial No. 350,563.

*To all whom it may concern:*

Be it known that I, JOHN POEHNER, a citizen of the United States of America, residing at Clearwater, in the county of Sedgwick and State of Kansas, have invented new and useful Improvements in Crank-Shafts, of which the following is a specification.

This invention relates to crank shafts, and particularly to crank shafts for self-binders of the type employing packers, the object of the invention being to provide a novel construction of double crank composed of but three main members, also to provide a novel construction of sectional crank-wrists and anti-friction bearings therefor, whereby the parts may be readily and quickly assembled for use and disassembled for repairs and renewal of parts and are adapted to easily operate.

A crank shaft constructed in accordance with the principles of my invention is shown in the accompanying drawing, in which:—

Figure 1 is a view in elevation with one of the bearings in section. Fig. 2 is a sectional side elevation on line 2—2 of Fig. 1. Fig. 3 is a vertical transverse section through one of the bearings and the wrist of one of the cranks. Fig. 4 is a section through the same parts taken on the line 4—4 of Fig. 3.

Referring to the drawing, 1 and 2 designate alined sections of a crank shaft, 3 and 4 the crank members of the double-crank thereof, and 5 the bearings in which the wrists of the cranks are journaled, as hereinafter described, which bearings are carried by the parts to be actuated by the cranks.

Each crank is composed of a pair of arms and an associated wrist pin of improved construction, 7 and 8 designating the arms of the crank 3 and 7' and 8' the corresponding arms of the crank 4. The outer arms 7 and 7' of the cranks 3 and 4 are secured to the shaft sections 1 and 2 in any preferred manner. In accordance with my invention, the inner arms 8 and 8' of the two cranks are joined by an angular connecting portion 8ª, forming a compound inner arm formed of a single piece of material and common to both cranks, the connecting portion 8ª being arranged at a diagonal angle to the line of the shaft to dispose the inner crank arms in proper parallel relation to their companion outer crank arms.

The wrists of the cranks are similar in construction, so that a description of one will suffice for both. By reference to Fig. 3 it will be seen that the inner arm 8' of the crank 4 is provided with a laterally extending socket 9 tapered interiorly to receive the exteriorly tapered portion of a projection 10 extending from the companion outer crank arm 7', the wall of the socket and the projection being of angular or other suitable form in cross section to hold said parts against relative rotation.

The socket 9 is of less length than the distance between the arms and rests at its outer end against a shoulder 11 formed upon the arm 7' at the inner end of the projection 10, the outer surfaces of the socket and shoulder being cylindrical to form a bearing surface. A coupling bolt 12 extends through the arms, socket and projection and is provided with a nut or key 13 to hold it from displacement. This bolt connects the parts of the wrist to prevent separation thereof, but by simply removing the nut such parts may be quickly and conveniently separated, thus adapting the cranks to be conveniently assembled and disassembled, as will be readily understood. The wrist is of less diameter than the internal diameter of the bearing 5 in which it fits, the intervening space forming a circular raceway 14 for the reception of an annular series of anti-friction bearing rollers 15, whereby the crank is adapted to turn freely in the bearings.

As a result of the construction described, it will be seen that a simple form of double-crank is provided whose parts are few in number and may be readily and quickly assembled and as readily and quickly disassembled for renewals or repairs. The construction described also permits the cranks to operate without binding in the bearings or causing objectionable strain on the mechanism operated thereby.

Having thus described the invention, what is claimed as new, is:—

1. In a crank shaft construction, a crank comprising arms, one having a laterally extending socket, and the other a laterally extending projection to seat within the socket, a fastening member extending through the parts and coupling them against disconnection, the engaging surfaces of the socket and projection being angular to prevent relative rotation thereof, a bearing, and anti-friction bearing members between said bearing and the wrist formed by said socket and projection.

2. In a crank shaft construction, a bearing, a crank comprising arms, said crank being provided with a wrist pin comprising a socket upon one arm and an interfitting projection upon the other arm, a fastening extending axially through the socket and projection, and anti-friction bearing members between said wrist pin and the wall of the bearing.

3. In a crank shaft construction, the combination of bearings, crank shaft sections, outer crank arms upon the crank shaft sections, inner crank arms integral with each other and connected with the outer crank arms by wrist pins extending through the bearings, each wrist pin comprising a socket on one arm and an interfitting projection on the other arm, combined with a fastening uniting the arms to hold the socket and pin from disconnection, and anti-friction bearings between the respective crank pins and the bearings.

In testimony whereof, I affix my signature in presence of two witnesses.

JOHN POEHNER.

Witnesses:
L. C. POWELL,
W. H. MATTHEWS.